(12) United States Patent
Kaverine et al.

(10) Patent No.: US 10,903,573 B2
(45) Date of Patent: Jan. 26, 2021

(54) ANTENNA WITH FERROMAGNETIC RODS WOUND AND COUPLED TOGETHER

(71) Applicants: TDF, Montrouge (FR); UNIVERSITE DE RENNES 1, Rennes (FR)

(72) Inventors: Evgueni Kaverine, Rennes (FR); Sébastien Palud, Rennes (FR); Mohamed Himdi, Rennes (FR); Franck Colombel, Monfort-sur-Meu (FR)

(73) Assignees: TDF, Montrouge (FR); UNIVERSITE DE RENNES 1, Rennes (FR)

( * ) Notice: Subject to any disclaimer, the term of this patent is extended or adjusted under 35 U.S.C. 154(b) by 0 days.

(21) Appl. No.: 16/335,492

(22) PCT Filed: Sep. 25, 2017

(86) PCT No.: PCT/FR2017/052574
§ 371 (c)(1),
(2) Date: Mar. 21, 2019

(87) PCT Pub. No.: WO2018/055313
PCT Pub. Date: Mar. 29, 2018

(65) Prior Publication Data
US 2020/0021027 A1 Jan. 16, 2020

(30) Foreign Application Priority Data
Sep. 26, 2016 (FR) .................... 16 59031

(51) Int. Cl.
*H01Q 7/08* (2006.01)
*H01Q 7/00* (2006.01)
*H04B 1/40* (2015.01)

(52) U.S. Cl.
CPC ............. *H01Q 7/08* (2013.01); *H01Q 7/005* (2013.01); *H04B 1/40* (2013.01)

(58) Field of Classification Search
CPC ............. H01Q 7/08; H01Q 7/005; H04B 1/40
(Continued)

(56) References Cited

U.S. PATENT DOCUMENTS

| 2002/0003503 A1* | 1/2002 | Justice | G08B 13/2477 343/788 |
| 2002/0024429 A1* | 2/2002 | Kamlah | B60R 25/246 340/426.1 |

FOREIGN PATENT DOCUMENTS

| FR | 1388350 A | * | 2/1965 | ............... H01Q 7/08 |
| FR | 1388350 A |   | 2/1965 | |

(Continued)

OTHER PUBLICATIONS

International Search Report dated Jan. 5, 2018, issued in corresponding International Application No. PCT/FR2017/052574, filed Sep. 25, 2017, 2 pages.
(Continued)

*Primary Examiner* — Ayodeji O Ayotunde
(74) *Attorney, Agent, or Firm* — Christensen O'Connor Johnson Kindness PLLC (57) ABSTRACT

The disclosure relates to a ferrite antenna comprising at least one main contour, comprising at least one first winding referred to as main winding, at least one first ferromagnetic rod referred to as main ferromagnetic rod and a tuning system, each main winding being wound around a main ferromagnetic rod and connected to the tuning system comprising a capacitor connected in parallel with the main winding. The ferrite antenna further comprises a non-resonant secondary contour, comprising a secondary winding separated electrically from each main winding and a secondary ferromagnetic rod around which the secondary winding is wound, and each main ferromagnetic rod and the secondary ferromagnetic rod are arranged parallel to one (Continued)

another so as to make it possible for a magnetic coupling of each main winding with the secondary winding.

10 Claims, 6 Drawing Sheets

(58) Field of Classification Search
USPC .......................................................... 455/77
See application file for complete search history.

(56) References Cited

FOREIGN PATENT DOCUMENTS

| | | | | |
|---|---|---|---|---|
| JP | 2000183632 A | * | 6/2000 | ............... H01Q 7/08 |
| JP | 2000183632 A | | 6/2000 | |

OTHER PUBLICATIONS

Written Opinion of the International Searching Authority dated Jan. 5, 2018, issued in corresponding International Application No. PCT/FR2017/052574, filed Sep. 25, 2017, 6 pages.

Sample, A.P., et al., "Analysis, Experimental Results, and Range Adaptation of Magnetically Coupled Resonators for Wireless Power Transfer," IEEE Transactions on Industrial Electronics 58(2):544-554, Feb. 2011.

Hu, H., et al., "Multiband and Broadband Wireless Power Transfer Systems Using the Conformal Strongly Coupled Magnetic Resonance Method," IEEE Transactions on Industrial Electronics 64(5):3595-3607, May 2017.

* cited by examiner

ANTENNA WITH FERROMAGNETIC RODS WOUND AND COUPLED TOGETHER

TECHNICAL FIELD OF THE INVENTION

The invention relates to an antenna for transmitting and/or receiving kilometric (30-300 kHz), hectometric (0.3-3 MHz) or decametric (3-30 MHz) frequency waves. In particular, the invention relates to a ferrite antenna with coupled ferromagnetic rods, i.e. comprising at least two windings wound around at least two ferromagnetic rods.

TECHNOLOGICAL BACKGROUND

Ferrite antennas generally have an impedance that is not adapted comprising a strong reactive component that does not make it possible for the effective use thereof in systems with standardised real impedance (for example 50Ω).

To reduce this reactive component, a tuning capacitor is used, obviating the reactive portion of the impedance but the impedance in general remains very high (tens-hundreds of kΩ), all the more so that the number of turns forming the winding is significant.

Thus, to obtain a weaker impedance, the number of turns of the winding is reduced, but this reduction results in a decrease in the gain of the antenna.

Other solutions have been proposed to obtain a ferrite antenna having a satisfactory gain and a reduced impedance, for example 50Ω, the input impedance of practically all devices intended for the field of radiofrequencies.

Figures 1A, 1B, 2A, 2B:
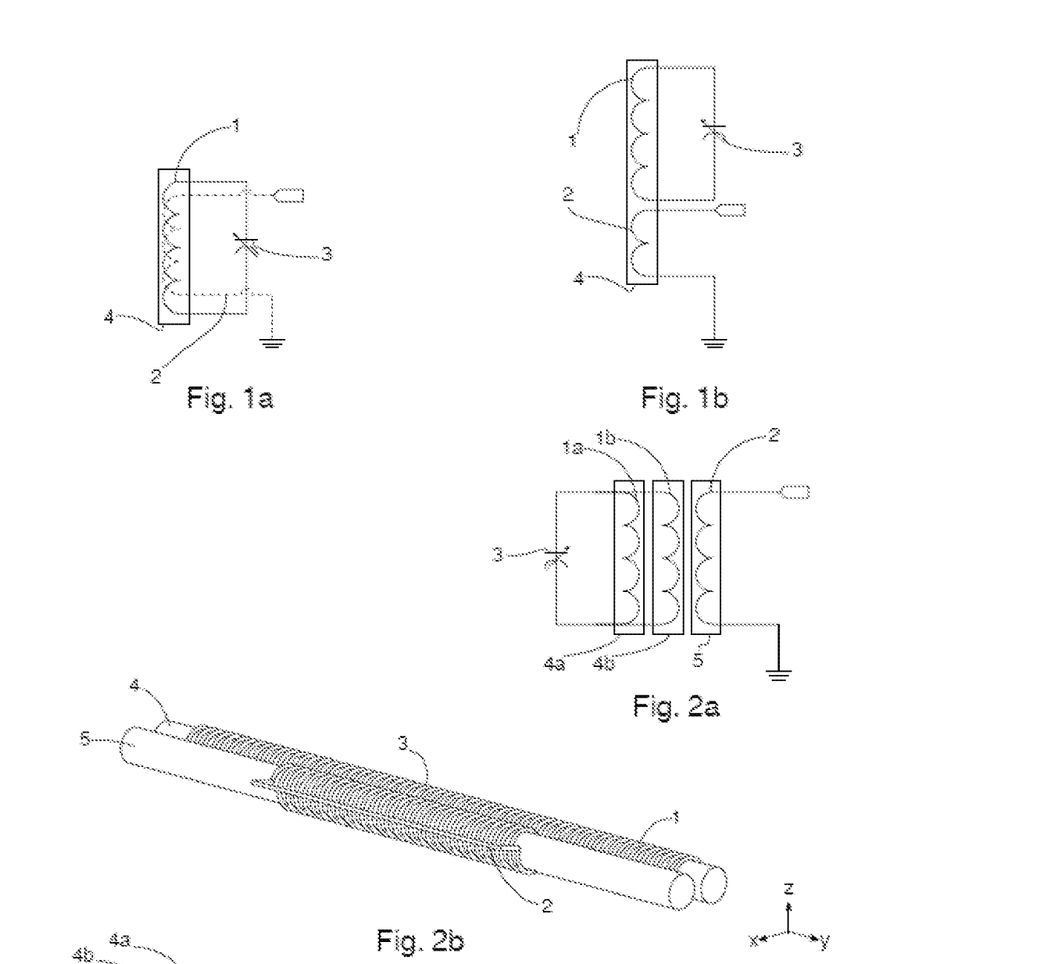
FIGS. 1a and 1b, already described, are schematic views of ferrite antennas according to the prior art.
FIG. 2a is a schematic view of a ferrite antenna according to a first embodiment of the invention.
FIG. 2b is a schematic, perspective view of a ferrite antenna according to a second embodiment of the invention.

These solutions, shown in FIGS. 1a and 1b, consist of adding to the main winding 1, a second winding, referred to as secondary winding 2 on the same ferromagnetic rod 4 (also called ferromagnetic core or ferrite core). The main winding 1 is connected to a tuning system 3, the main winding 1 and the tuning system 3 thus forming a resonant contour referred to as main contour.

In a first solution shown in FIG. 1a, the secondary winding 2 is wound above the main winding 1.

In a second solution shown in FIG. 1b, the two windings are wound side by side.

These solutions make it possible for a better adaptation of impedance, but have other disadvantages: the antenna according to the first solution quickly loses the second resonance thereof, even with a moderate number of turns on main winding 1. An antenna according to the second solution requires a sharing of the space on the ferromagnetic rod 4, which reduces the maximum potential effectiveness of the antenna because the main contour 3 cannot occupy all of the length of the ferromagnetic rod 4. In addition, the impedance at the resonance of this antenna depends on the number of turns of the secondary winding 2, but also the respective position of the two windings on the ferromagnetic rod, which can make using this solution difficult from a practical standpoint. Furthermore, this solution only makes it possible for changes in the tuning frequency by modifying the values of the components forming the tuning system.

Finally, the two solutions have an effectiveness that is greatly reduced at frequencies higher than the resonance frequency which implies the use thereof only at the tuning frequency. In particular, the impedance of the antennas according to the solutions of the prior art at the secondary resonance is either practically zero (first solution), or very low (about 5Ω for the second solution).

The inventors have thus sought an alternative solution to the solutions proposed for an adaptation of a ferrite antenna at a low real impedance, in particular at 50Ω.

OBJECTIVES OF THE INVENTION

The invention aims to overcome at least some of the disadvantages of known ferrite antennas.

In particular, the invention aims to provide, in at least one embodiment of the invention, a ferrite antenna that can simply and effectively be tuned to a real impedance, in particular 50Ω.

The invention also aims to provide, in at least one embodiment, a ferrite antenna of which the effectiveness is maximised.

The invention also aims to provide, in at least one embodiment, a ferrite antenna that has good frequency agility, making it possible to widen the total tuning band of the antenna.

The invention also aims to provide, in at least one embodiment, a ferrite antenna of which the bandwidth is widened.

The invention also aims to provide, in at least one embodiment, a ferrite antenna that has a multi-resonance.

The invention also aims to provide, in at least one embodiment, a ferrite antenna with a high-impedance secondary resonance.

The invention also aims to provide, in at least one embodiment, a ferrite antenna with a gain that is higher than the solutions of the prior art beyond the main resonance.

DESCRIPTION OF THE INVENTION

To do this, the invention relates to a ferrite antenna for transmitting and/or receiving kilometric, hectometric or decametric frequency waves, comprising:
- at least one first resonant contour, referred to as main contour, comprising at least one first winding referred to as main winding, at least one first ferromagnetic rod referred to as main ferromagnetic rod and a tuning system, each main winding being wound around a main ferromagnetic rod and connected to a tuning system comprising a capacitor connected in parallel with the main winding, characterised in that it further comprises:
- a second non-resonant contour, referred to as secondary contour, comprising a secondary winding separated electrically from each main winding and a secondary ferromagnetic rod around which the secondary winding is wound, and in that each main ferromagnetic rod and the secondary ferromagnetic rod are arranged parallel to one another so as to make it possible for a magnetic coupling of each main winding with the secondary winding.

A ferrite antenna according to the invention therefore makes it possible for an adaptation of the ferrite antenna at an actual impedance, in particular 50Ω, thanks to the use of a secondary winding arranged on a ferromagnetic rod other than that of the main winding. The ferromagnetic rods are not connected to one another. The secondary contour is non-resonant, because contrary to the main contour, it does not have a capacitor and thus does not form an LC circuit.

This arrangement furthermore makes it possible to maximise the effectiveness of the antenna, because the main winding can occupy all of the first ferromagnetic rod. By using several main windings connected in parallel (and physically parallel), the effectiveness of the range of the antenna is improved.

Furthermore, an antenna according to the invention has a high-impedance secondary resonance, of the order of kΩ.

In addition, the gain of the antenna is improved beyond the main resonance because the magnetic fluxes in the main windings and the secondary winding are substantially in phase, contrary to the prior art where they are phase-shifted by 180°.

The antenna can be used in a low-power transmission system, such as RFID (Radio Frequency Identification), transmitting/receiving systems (simplex, duplex or full duplex) wideband and long range, as well as systems for receiving and intercepting information in the form of signals modulated or not that propagate over the air. The antenna can furthermore be used in metal detectors.

In particular, the invention has two resonances, which can be used to carry out simultaneous transmission/receiving. In this case, use will be made more preferably of the resonance that is closest to 50 ohms for transmitting and the other resonance with higher impedance for receiving.

Advantageously and according to the invention, the main ferromagnetic rod and the secondary ferromagnetic rod are configured to be able to be moved in translation with respect to one another along the main directions thereof.

According to this aspect of the invention, the movement of the ferromagnetic rods with respect to one another facilitates adjusting of the resonance frequency of the ferrite antenna.

Advantageously and according to the invention, the capacitor is a variable capacitor.

According to this aspect of the invention, the modification of the value of the capacitance of the variable capacitor makes it possible to adjust the tuning of the antenna.

Advantageously, an antenna according to the invention comprises at least one second main contour, referred to as additional contour, and arranged in parallel to the main contour and to the secondary contour.

According to this aspect of the invention, the antenna has a widened bandwidth if the main additional contour(s) has/have a main winding that has an identical number of turns around the main ferromagnetic rod, or has multiple resonances if the main additional contour(s) has/have a main winding that has a different number of turns around the main ferromagnetic rod. The position of the main contours with respect to one another furthermore influences the bandwidth or the multi-resonance.

Each additional contour is connected to a capacitor, which can be for each additional contour, of a fixed or variable value. The capacitors of each additional contour can have a quality factor that is identical or different according to the additional contours. These differences can contribute to adjusting the multi-resonant aspect or wide band of the antenna.

Advantageously and according to the latter aspect of the invention, at least one of the additional contours is configured to be able to be moved in translation with respect to the main contour, in a direction transverse to the main direction of the main ferromagnetic rod of the main contour. According to this aspect of the invention, bringing together or separating the main additional contours making it possible for a frequency adaptation of the antenna, making it possible, for example, to obtain a multi-resonant or wideband antenna of which the resonant frequencies or the bandwidth can be adjusted.

The use of a variable capacitor and/or of mechanical movement of a contour with respect to the others makes it possible to adjust the main tuning frequency of the antenna without losing the adaptation or the effectiveness. This is not the case with the prior art solutions, which are in particular limited in terms of mechanical settings by a quick drop in adaptation or effectiveness.

The invention also relates to an antenna system, characterised in that it comprises two ferrite antennas according to the invention, a first ferrite antenna and a second ferrite antenna of which the main and secondary ferromagnetic rods extend along a direction perpendicular to the direction of the main and secondary ferromagnetic rods of the first ferrite antenna, and the second ferrite antenna having an electrical phase shift of $\pm\pi/4$ with respect to the first ferrite antenna.

According to this aspect of the invention, the antenna system makes it possible to obtain an omnidirectional range with ferrite antennas that naturally have radiation nulls at the end of the ferromagnetic rods. Furthermore, the antenna system obtained can be used for a direction-finding function by connecting each antenna to an acquisition system that determines the direction of the signal to be located according to the amplitudes and phases of the signal at the output of the antennas.

The invention also relates to a kilometric, hectometric or decametric frequency waves transmitting/receiving system, characterised in that it comprises a ferrite antenna according to the invention.

A transmitting/receiving system according to the invention can be used for example such as a low-power transmitting system, such as RFID systems (for Radio Frequency Identification), transmitting/receiving systems (simplex, duplex or full duplex) wideband and long range as well as systems for receiving and intercepting information in the form of signals modulated or not which propagate through the air.

The invention also relates to a system for transmitting/receiving of kilometric, hectometric or decametric frequency waves, characterised in that it comprises an antenna system according to the invention.

A transmitting/receiving system according to the invention can be used for example as a directional-finding acquisition system which makes it possible to determine the direction of a signal to be located according to the amplitudes and phases of the signal received at the output of the antennas forming the antenna system.

In particular, the invention also relates to a system for transmitting/receiving of the electronic communication terminal type for receiving and/or the transmitting kilometric, hectometric or decametric frequency waves, characterised in that it comprises an antenna according to the invention, and a device for transmitting/receiving connected to the antenna and adapted for processing the signals received by the antenna and/or transmitting to the antenna, signals to be transmitted.

Advantageously, an electronic communication terminal according to the invention comprises means for the electronic and/or mechanical adjustment of the main tuning frequency of the antenna.

In particular, when the antenna comprises a variable capacitor, the adjustment means can make it possible to modify the capacitance of said variable capacitor. When the antenna comprises contours or ferromagnetic rods that can be moved in translation with respect to one another (embodiment described hereinabove), the adjustment means can make it possible for the mechanical movement of said contours or ferromagnetic rods.

The invention also relates to an antenna, an antenna system, a transmitting/receiving system and an electronic communication terminal characterised in combination by all or some of the characteristics mentioned hereinabove or hereinafter.

LIST OF FIGURES

Other aims, characteristics and advantages of the invention will appear upon reading the following description which is given solely in a non-limiting manner and in reference to the appended figures, wherein.

DETAILED DESCRIPTION OF AN EMBODIMENT OF THE INVENTION

The following embodiments are examples. Although the description refers to one or more embodiments, this does not necessarily mean that each reference relates to the same embodiment, or that the characteristics apply only to one single embodiment. Simple features of different embodiments can also be combined in order to supply other embodiments. In the figures, the scales and the proportions are not strictly respected and this, for the purposes of illustration and clarity.

FIG. 2a schematically shows a ferrite antenna according to a first embodiment of the invention.

The ferrite antenna comprises two main parallel windings (physically and electrically), a first main winding 1a wound around a first main ferromagnetic rod 4a and a second main winding 1b wound around a second main ferromagnetic rod 4b, connected in parallel to a tuning system 3 formed by a capacitor. The capacitor can be a variable capacitor in order to be able to modify the capacitance value of said variable capacitor and thus make it possible for frequency tunability of the antenna. The tuning system 3 and the two main windings 1a, 1b form a main contour. According to other embodiments, the main windings can be connected in series.

According to a second embodiment of the invention shown schematically and perspectively in FIG. 2b, the ferrite antenna comprises one single main winding 1 and the main winding 1 comprises a different number of turns (here greater, in order to maximise the effectiveness of the range) than the secondary winding 2, so as to adjust the impedance of the tuning.

Figure 2C:
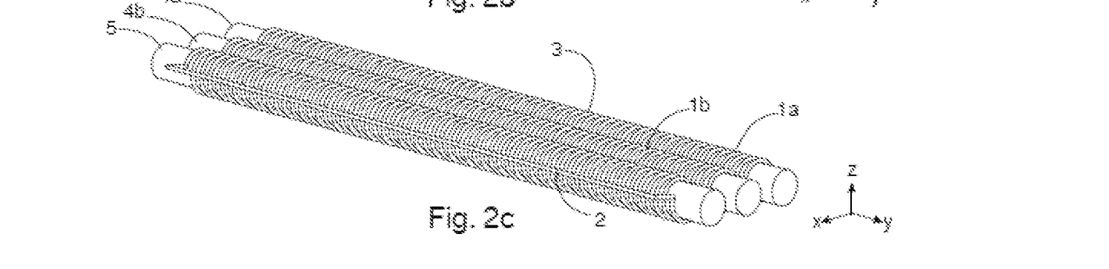
FIG. 2c is a schematic, perspective view of a ferrite antenna according to a third embodiment of the invention.

According to a third embodiment of the invention shown schematically and perspectively in FIG. 2c, the ferrite antenna comprises, as in the first embodiment of FIG. 2a, two main windings 1a, 1b and a secondary winding 2, comprising here the same number of turns.

To improve the adaptation thereof, the ferrite antenna further comprises a non-resonant secondary contour formed from a secondary winding 2 wound around a secondary ferromagnetic rod 5. Contrary to the main contour, the secondary contour is not associated with a capacitor and therefore does not form a resonant LC circuit.

The main windings 1a, 1b and the secondary winding 2 are physically parallel, the secondary winding 2 is electrically separated from the main windings, and the windings are centred on the ferromagnetic rods thereof.

The ferromagnetic rods preferably have shapes, dimensions and radioelectric properties that are identical. The rods comprise of so-called "soft" ferromagnetic materials, typically with an NiZn or MnZn base and have losses that are preferably low (tan δ<<1) in the working frequency band of the ferrite antenna.

The direction of the winding between the main winding(s) and the secondary winding can be identical or different, without impacting the effectiveness of the range at the main resonance frequency. The section of the wire forming the winding is preferably identical in all of the windings and has strong conductivity. For example, the windings can be formed of Litz wire for an increase in the effectiveness of the range.

The tuning system 3 makes it possible for adjustment of the ferrite antenna: in particular, the capacitor of the tuning system 3 of capacitance C forms with the inductance winding L a contour LC with a first resonance frequency $f_{r1}$, referred to as tuning frequency, approximately equal to:

$$f_{r1} \approx \frac{1}{2\pi\sqrt{LC}}$$

Figure 3:
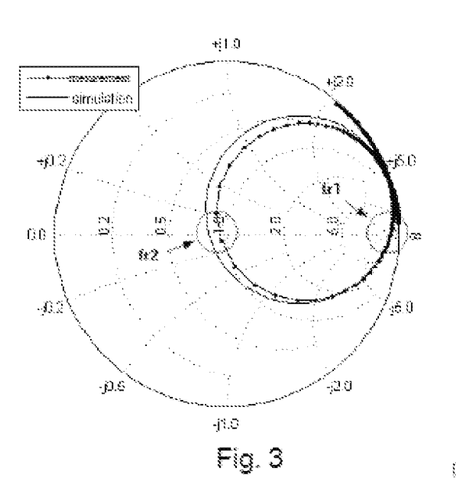
FIG. 3 is a graph showing the change in the output impedance of a ferrite antenna according to an embodiment of the invention on a Smith chart.

The main contour alone has a substantial actual impedance at this first resonance frequency $f_{r1}$. The secondary winding 2 makes it possible to create a second resonance frequency $f_{r2}$ wherein the voltage and the current are set into phase so as to provide an actual impedance that is lower with respect to the first resonance frequency $f_{r1}$. FIG. 3, showing a graph that represents the change in the output impedance of a ferrite antenna according to an embodiment of the invention on a Smith chart, by simulation or by measurement on an actual ferrite antenna, shows the resonance frequencies $f_{r1}$ and $f_{r2}$.

Figure 4:
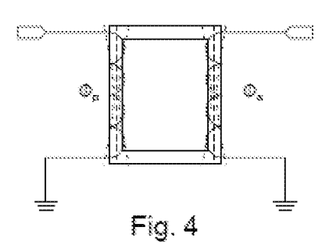
FIG. 4 is a schematic view of the magnetic fluxes circulating between two windings of the transformer winding type.
Figure 8:
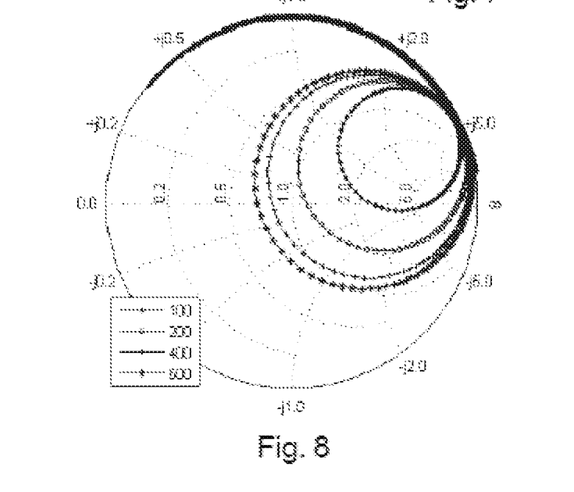
FIG. 8 is a graph showing the change in the output impedance of a ferrite antenna according to various embodiments of the invention on a Smith chart according to the magnetic permeability of the ferromagnetic rods.

The operation of the ferrite antenna according to the invention is based on a principle of magnetic coupling, similar to the operation of a transformer, and such as shown in FIG. 4 showing the magnetic flux circulating between two windings. In this figure, the windings are wound on the same ferromagnetic core forming a closed loop. The magnetic flux ϕp of the first winding is transmitted to the magnetic flux Os of the second winding, with a coupling coefficient k that is generally between 0.3 and 0.6 using materials of which the relative magnetic permeability varies between 100 and 600. FIG. 8 shows a graph representing the change in the output impedance of a ferrite antenna according to various embodiments of the invention on a Smith chart according to the relative magnetic permeability of the ferromagnetic rods, with the values 100, 200, 400 and 600.

In the ferrite antenna according to the invention, the ferromagnetic rods do not form a closed loop and the magnetic fluxes are directed in the same direction (when the antenna is in operation close to the resonance and after the resonance) so as to be added together in a constructive manner, which makes it possible for effective propagation of the electromagnetic wave generated by the ferrite antenna.

Contrary to the prior art solutions of FIGS. 1a and 1b wherein the magnetic fluxes are inverted beyond the resonance frequency, the direction of the magnetic fluxes in the ferrite antenna according to the invention remains in the same direction, making it possible to retain a substantial gain even beyond the tuning frequency, which makes use in a damped system possible.

The ferrite antenna according to the invention makes it possible to obtain a low impedance at the second resonance frequency $f_{r2}$: when the number of turns of the main winding or windings and of the secondary winding 2 are identical, the impedance at the second resonance frequency $f_{r2}$ is about from 20Ω to 200Ω, according to the quality factor of the resonant contour, the level of coupling of the windings which is a function of the spacing between the main winding(s) and the secondary winding, the number of turns in the windings and the relative permeability of the ferromagnetic rods.

The number of turns of the secondary winding 2 makes it possible to adjust this impedance, with a decrease in the number of turns driving a decrease in impedance.

A stronger impedance, between several hundred ohms to several kΩ is obtained at the first resonance frequency $f_{r1}$. This impedance is adjusted in the same manner by the number of turns of the secondary winding or the spacing between the windings.

The frequencies at the resonance can be adjusted by variation of the tuning capacitor but also by transverse movement of the first ferromagnetic rod 4 with respect to the second ferromagnetic rod 5.

Figure 5:
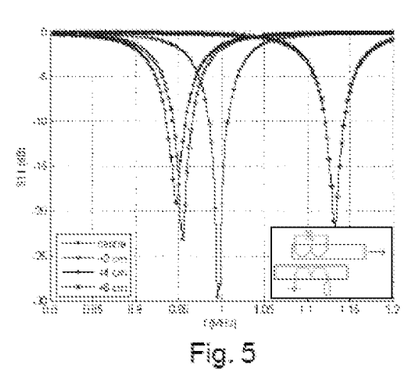
FIG. 5 is a graph showing the level of adaptation of a ferrite antenna according to an embodiment of the invention according to the position of the main ferromagnetic rod with respect to the secondary ferromagnetic rod.

FIG. 5 shows a graph that represents the level of adaptation of a ferrite antenna according to an embodiment of the invention adapted to 50Ω according to the position of the main ferromagnetic rod with respect to the secondary ferromagnetic rod. The curves represent a zero movement (centre), or two, four, and six centimetres in the main direction of the main ferromagnetic rod and in the direction indicated by the diagram at the bottom right. The movement of the rod makes it possible for the adaptation towards higher frequencies (due to the decrease in the inductance of the main winding 1) and an increase in the actual portion of the impedance. The maximum movement of the rod permitted is about from 20% to 40% of the length of the rod. When the contour comprises several main windings and therefore several main ferromagnetic rods, the movements of the main ferromagnetic rods 4 can be identical or different from one rod to the other.

Figure 6:
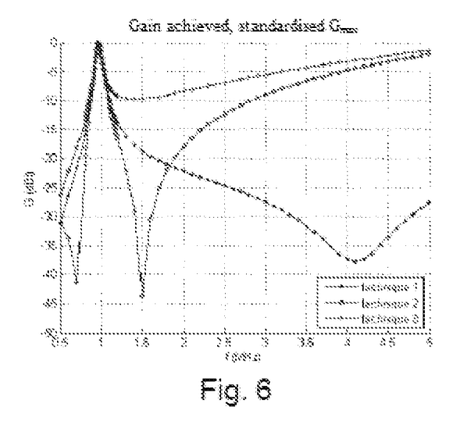
FIG. 6 is a graph comparing the gain of a ferrite antenna according to an embodiment of the invention and antennas according to the prior art, according to frequency.

FIG. 6 shows a graph comparing the gain of a ferrite antenna according to an embodiment of the invention and of antennas according to the prior art described hereinabove (the key "technique 1" corresponds to an antenna such as shown in FIG. 1a, the key "technique 2" corresponds to an antenna such as shown in FIG. 1b, the key "technique 3" corresponds to a ferrite antenna according to the invention) according to the frequency. The three antennas have identical ferromagnetic rods, the same number of winding turns and ferromagnetic rods centred on the winding.

If the performance of the antennas is comparable at the first resonance frequency (here 1 MHz), the antenna according to the invention has a drop less than the gain at higher frequencies. The antenna according to the invention thus has a wider frequency band, and can be, for example, used in a duplex system wherein the receiving frequency is higher than the transmitting frequency at the resonance frequency.

Figure 9:
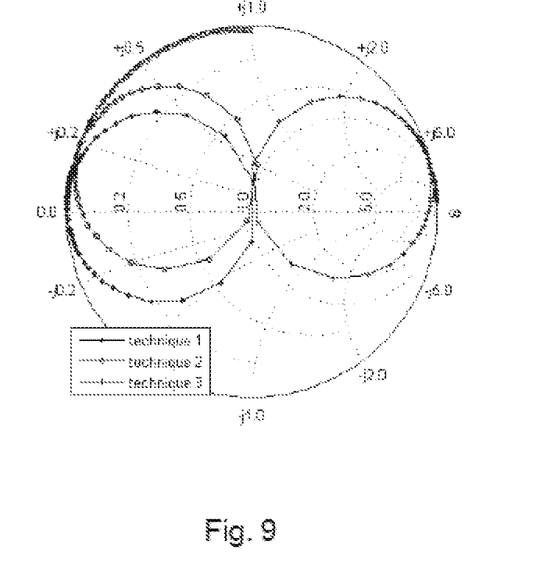
FIG. 9 is a graph comparing the change in the output impedance of a ferrite antenna according to an embodiment of the invention and of antennas according to the prior art on a Smith chart.

FIG. 9 shows a graph comparing the change in the output impedance of a ferrite antenna according to an embodiment of the invention and of the prior art antennas on a Smith chart. The key of the curves is identical to the curves of FIG. 5. The windings of the three antennas have the same number of turns. For the same number of turns and the same gain, the antenna shown in FIG. 1a (technique 1) has only one impedance that can be used, the second being practically zero, the antenna shown in FIG. 1b (technique 2) has a low impedance at the secondary resonance, less than 5Ω, and the antenna according to the invention (technique 3) has a high impedance at the secondary resonance, around 1kΩ.

Figure 7:
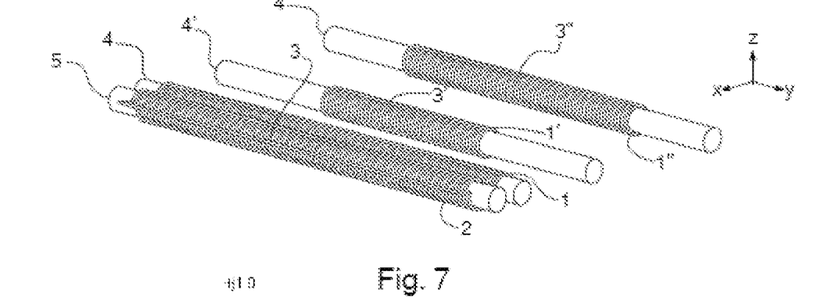
FIG. 7 is a schematic, perspective view of a ferrite antenna according to a fourth embodiment of the invention.

FIG. 7 schematically, perspectively shows a ferrite antenna according to a fourth embodiment of the invention. In this embodiment, the ferrite antenna comprises a plurality of main contours, each one formed from a main 1, 1', 1" winding wound around a main ferromagnetic rod 4, 4' and 4". The ferrite antenna comprises a unique secondary winding 2 wound around a secondary ferromagnetic rod 5, to which is coupled the main 1, 1' and 1" windings.

The main 1, 1' and 1" windings comprise a different number of turns, so as to form a multi-resonant antenna, i.e. having several resonance frequencies, in particular as many as there are main contours. In other embodiments not shown, the main contours have main windings that have characteristics that are close in terms of the number of turns and tuning by the tuning system, so as to form a wideband antenna: a multi-resonant antenna with close resonance frequencies makes it possible for the widening of the frequency band and forms a wideband antenna. Likewise, a sound choice in the quality factors of the various capacitors makes it possible to generate a multi-resonant response with a bandwidth that variable in terms of frequency or on the contrary, wideband.

According to an embodiment of the invention, at least one additional contour, or all of the additional contours, can be separated or be close together to the main contour in a transverse direction (therefore perpendicular) to the main direction of the main contour, so as to make it possible for a frequency adaptation of the antenna.

Figure 10:
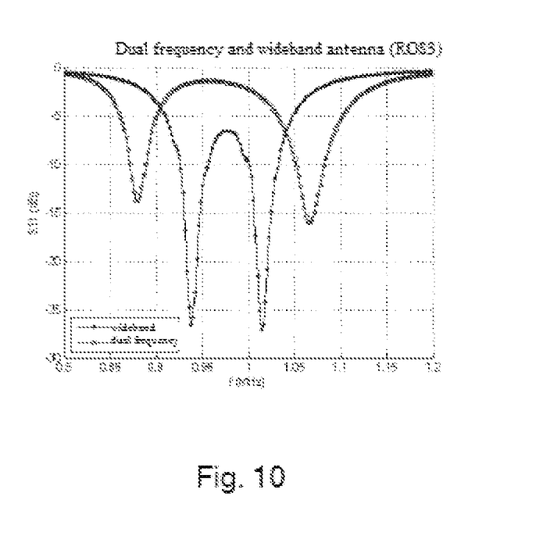
FIG. 10 is a graph showing the gain of a ferrite antenna according to two embodiments of the invention comprising several main contours according to the frequency.

FIG. 10 shows a graph that represents the gain of a ferrite antenna according to two embodiments of the invention comprising several main contours according to the frequency, such as the ferrite antenna described in reference to FIG. 7. In particular, the "wideband" curve corresponds to an antenna that has a wideband between 0.92 MHz and 1.04 MHz, and the "dual frequency" curve corresponds to an antenna that has a resonance at two frequencies, 0.87 MHz and 1.06 MHz.

Figure 11:
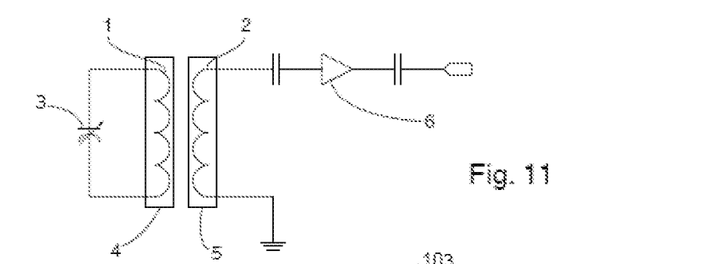
FIG. 11 is a schematic view of a ferrite antenna according to a fifth embodiment of the invention connected to an amplifier.

FIG. 11 schematically shows a ferrite antenna according to a fifth embodiment of the invention used for receiving and comprising a single main winding 1, and connected to an amplifier 6 on secondary winding 2. The amplifier 6 requires at the input thereof, a specific impedance for optimum operation, which can be obtained by adjusting the impedance of the ferrite antenna as explained hereinabove. For a ferrite antenna according to the invention used for transmitting, the antenna has to be connected to a transmitting device, for example directly to a generator or then to an amplifier output and must have the same input impedance as the transmitting device in order to prevent return of the injected power.

Figure 12A:
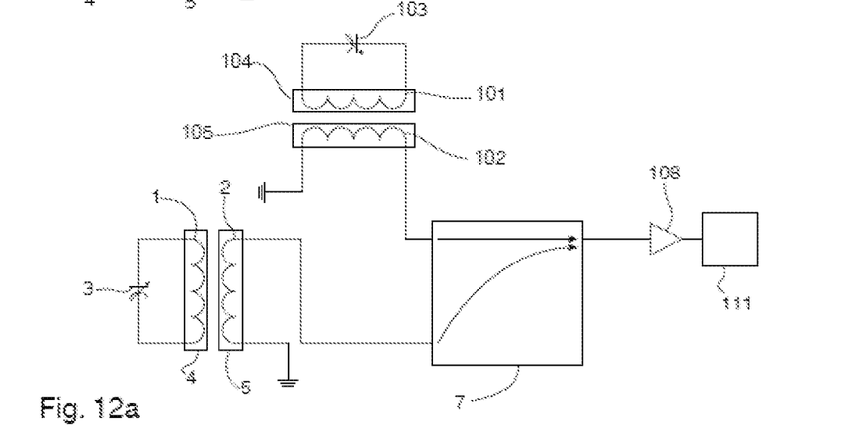
FIGS. 12a, 12b and 12c are schematic views of antenna systems according to various embodiments of the invention.
Figure 12B:
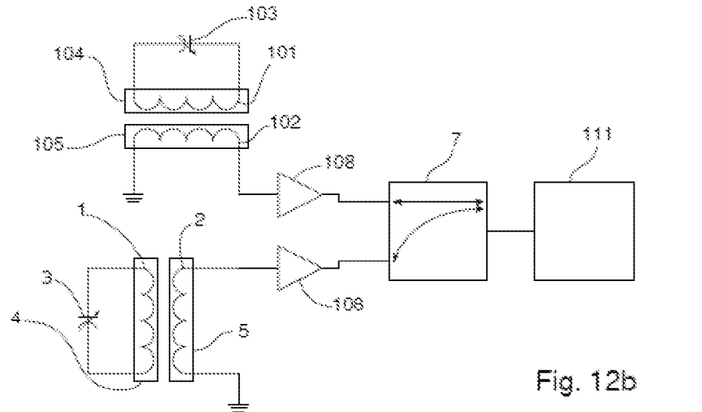
Figure 12C:
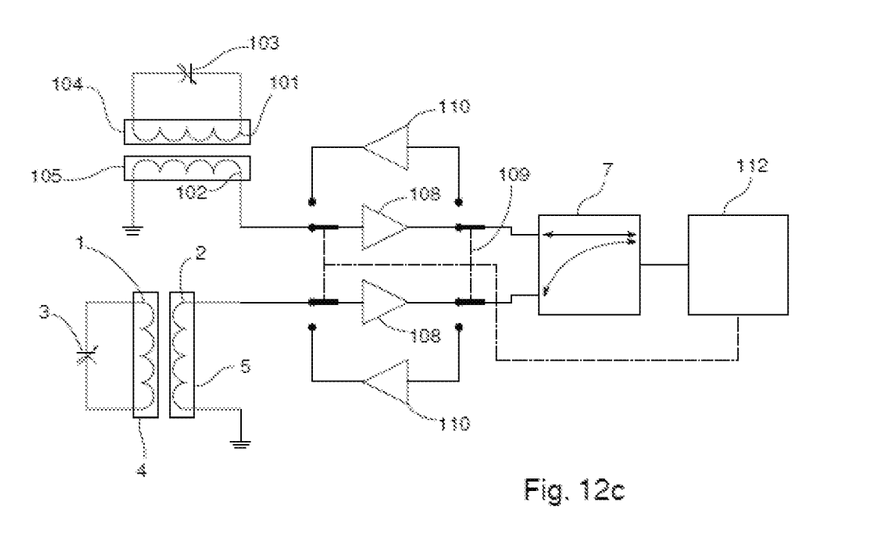
Figure 13:
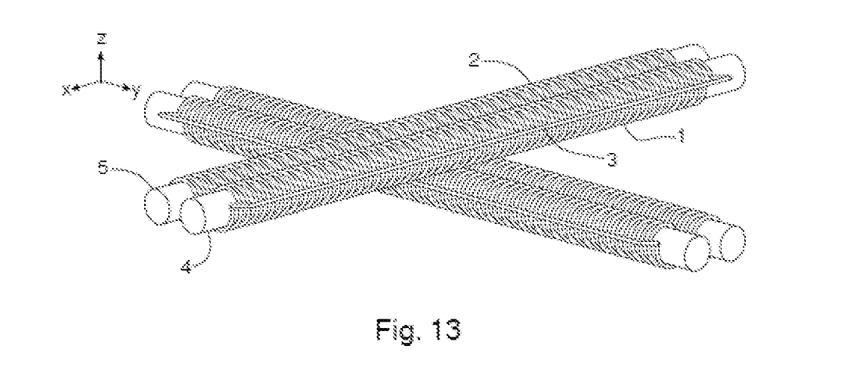
FIG. 13 is a schematic, perspective view of an antenna system according to an embodiment of the invention.

FIGS. 12a, 12b and 12c schematically show antenna systems according to various embodiments of the invention connected to telecommunications equipment so as to form an electronic communication terminal (or telecommunication terminal), and FIG. 13 schematically shows an antenna system according to one of these embodiments in perspective.

The antenna systems each comprise two ferrite antennas according to an embodiment of the invention:
  a first ferrite antenna comprising a main winding 1 wound around a main ferromagnetic rod 4 and connected to a tuning system 3, as well as a secondary winding 2 wound around a secondary ferromagnetic rod 5,
  a second ferrite antenna comprising a main winding 101 wound around a main ferromagnetic rod 104 and connected to a tuning system 103, as well as a secondary winding 102 wound around a secondary ferromagnetic rod 105.

The two ferrite antennas, in particular the secondary 2, 102 windings thereof are connected to a phase shifter 7, making it possible for an electrical phase shift between the two antennas by ±π/4. The phase shifter operates only if the ferrite antennas have the same characteristic impedance as the phase shifter, which is possible using the possibilities for adjusting the impedance described hereinabove.

In the embodiment shown in FIG. 12a, the phase shifter of the antenna system is an amplifier 108 and with a receiving device 111 (or receiver). In this embodiment, the antennas are adapted to 50Ω. The phase shifter also has a characteristic impedance of 50Ω and is therefore connected directly, on the one hand, to the antennas, on the other hand, to the amplifier 108 also adapted to 50Ω. The signal amplified by the amplifier is transmitted to the receiver 111.

In the embodiment shown in FIG. 12b, each antenna of the antenna system is connected to a high-impedance amplifier 108. The high-impedance amplifiers 108 are connected to the phase shifter 7 and the phase shifter 7 is connected to a receiver 111. In this embodiment, the antennas are adapted to 1kΩ and can thus be connected to the high impedance amplifiers 108 that have an impedance that is higher than the antennas and having an optimum operation when the antennas are adapted to 1kΩ. The output impedances of the high impedance amplifiers 108 are however 50Ω and are thus connected to the phase shifter 7, which transmits the phase-shifted signal and combined with the receiver 111.

In the embodiment shown in FIG. 12c, the antenna system is similar to the embodiment shown in FIG. 12b, wherein the receiver is replaced with a transmitting/receiving device 112 (or transmitter/receiver), and to which is added a circuit making it possible for the transmission via two amplifiers 110 at impedance 50Ω parallel to the high impedance amplifiers 108. Relays 109 make it possible to choose between transmitting and receiving. Thanks to the double resonance of the antennas of the antenna system, it is possible to use a first resonance with low impedance (50Ω) for transmitting, and a second resonance at high impedance (a few kΩ) for receiving. According to other embodiments, transmitting and receiving can operate on a single frequency with impedance at 50Ω for all of the amplifiers.

As shown in FIG. 13, the two ferrite antennas are arranged perpendicularly to one another, such that each antenna offsets the radiation nulls of the other antenna at the ends of the ferromagnetic rods. The system obtained thus has an omnidirectional range, and can be used in particular for direction-finding applications.

The antennas and the antenna systems described can be integrated into a wave transmitting/receiving system or an electronic communication terminal, with these systems or terminals comprising transmitting devices (for example, a generator with or without an amplifier) and/or receiving devices (connected to a transmission line for example, via an amplifier).

The invention claimed is:

1. A ferrite antenna for transmitting and/or receiving kilometric, hectometric or decametric frequency waves, comprising:
  at least one first resonant contour, referred to as main contour, comprising at least one first winding referred to as main winding at least one first ferromagnetic rod referred to as main ferromagnetic rod and a tuning system, each main winding being wound around a main ferromagnetic rod and connected to the tuning system comprising a capacitor connected in parallel with the main winding, so as to create a first resonance frequency, referred to as tuning frequency;
  a second contour, referred to as secondary contour, comprising a secondary winding separated electrically from each main winding and a secondary ferromagnetic rod around which the secondary winding is wound,
  wherein,
  said secondary contour is non-resonant in that it does not comprise any capacitor so that the secondary contour does not form a resonant LC circuit, and
  each main ferromagnetic rod and the secondary ferromagnetic rod are arranged parallel to one another so as to make it possible for a magnetic coupling of each main winding with the secondary winding, so as to create a second resonance frequency which is different from the tuning frequency.

2. The ferrite antenna according to claim 1, wherein the main ferromagnetic rod and the secondary ferromagnetic rod are configured to be able to be moved in translation with respect to one another along the main directions thereof.

3. The ferrite antenna according to claim 1, wherein the capacitor is a variable capacitor.

4. The ferrite antenna according to claim 1, comprising at least one second main contour, referred to as additional contour, and arranged in parallel to the main contour and to the secondary contour.

5. The ferrite antenna according to claim 4, wherein at least one of the additional contours is configured to be able to be moved in translation with respect to the main contour, in a direction transverse to the main direction of the main ferromagnetic rod of the main contour.

6. An antenna system, comprising two ferrite antennas according to claim 1, a first ferrite antenna and a second ferrite antenna of which the main and secondary ferromagnetic rods extend along a direction perpendicular to the direction of the main and secondary ferromagnetic rods of the first ferrite antenna, and the second ferrite antenna having an electrical phase shift of $\pm\pi/2$ with respect to the first ferrite antenna.

7. A system for transmitting/receiving kilometric, hectometric or decametric frequency waves, comprising a ferrite antenna according to claim 1.

8. A system for transmitting/receiving kilometric, hectometric or decametric frequency waves, comprising an antenna system according to claim 6.

9. An electronic communication terminal for receiving and/or transmitting kilometric, hectometric or decametric frequency waves, comprising an antenna according to claim 1, and a device for transmitting/receiving connected to the antenna and adapted for processing the signals received by the antenna and/or transmitting to the antenna, signals to be transmitted.

10. The electronic communication terminal according to claim 9, comprising means for electronically and/or mechanically adjusting the main tuning frequency of the antenna.

\* \* \* \* \*